A. C. SAXTON AND H. J. MENARD.
LOCK FOR CONTROLLING LEVERS.
APPLICATION FILED JULY 15, 1916.
1,394,359.
Patented Oct. 18, 1921.
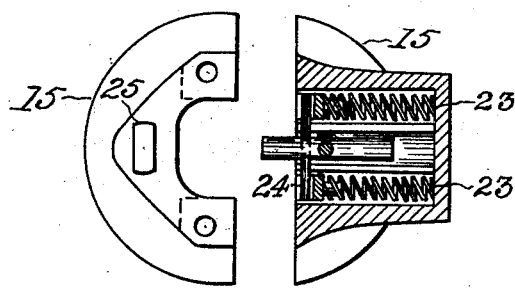
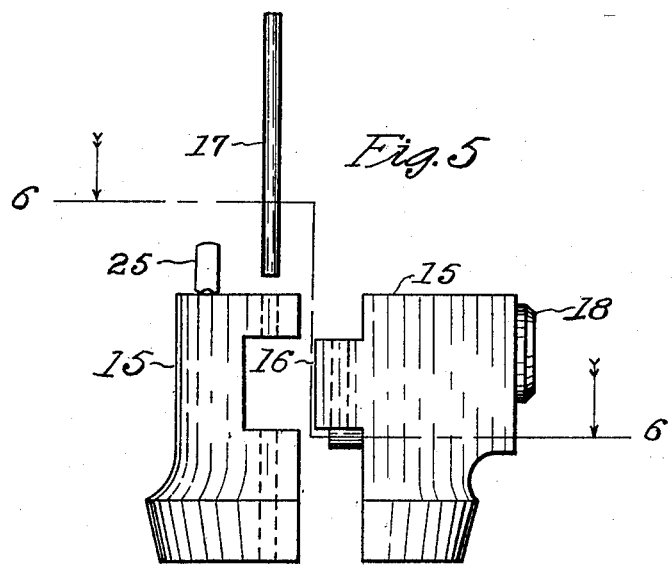

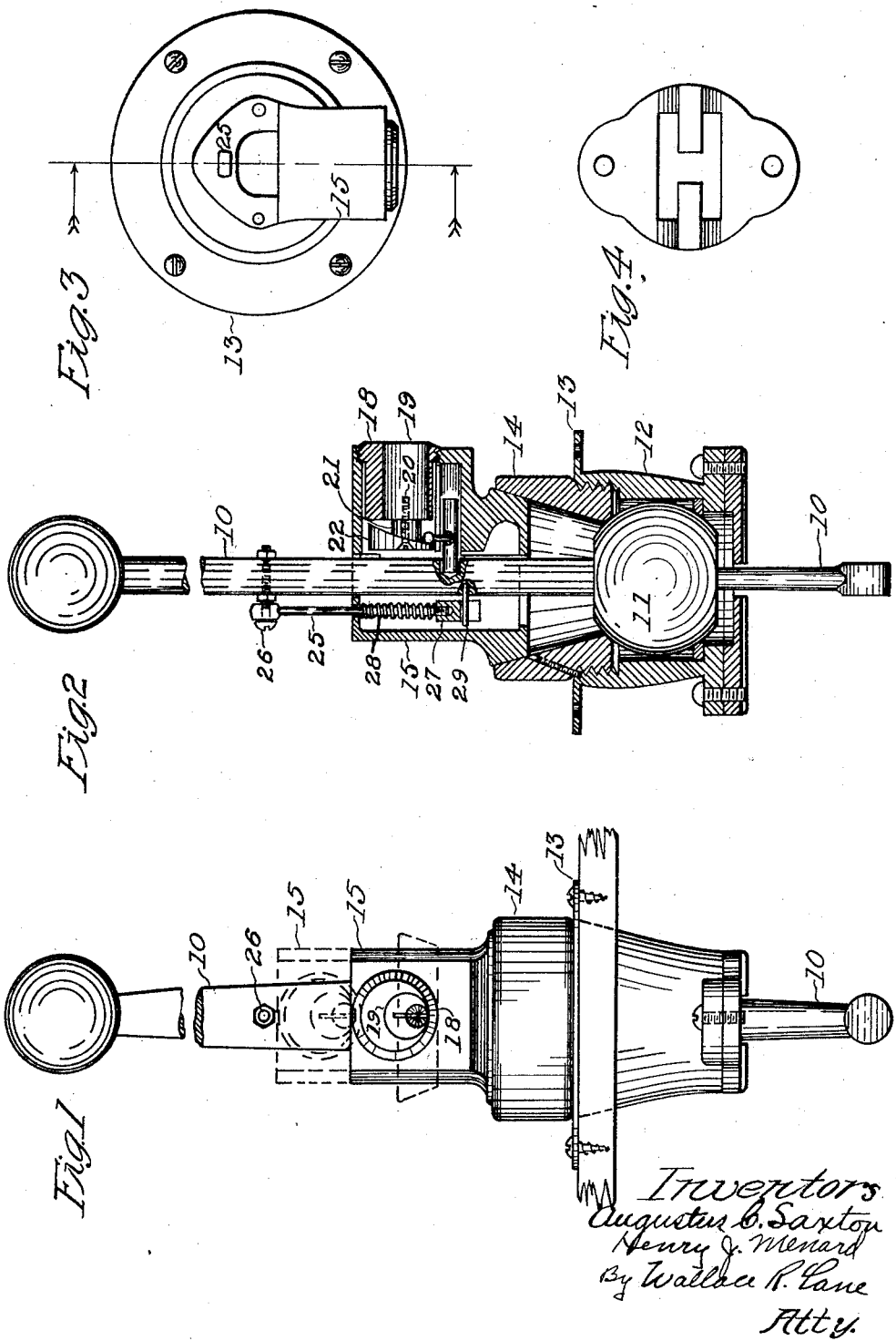

UNITED STATES PATENT OFFICE.

AUGUSTUS C. SAXTON AND HENRY J. MENARD, OF CHICAGO, ILLINOIS, ASSIGNORS TO H. R. MANUFACTURING COMPANY, OF CHICAGO, ILLINOIS, A CORPORATION OF ILLINOIS.

LOCK FOR CONTROLLING LEVERS.

1,394,359.  Specification of Letters Patent.  Patented Oct. 18, 1921.

Application filed July 15, 1916. Serial No. 109,435.

*To all whom it may concern:*

Be it known that we, AUGUSTUS C. SAXTON and HENRY J. MENARD, citizens of the United States, residing at Chicago, in the county of Cook and State of Illinois, have invented new and useful Improvements in Locks for Controlling Levers, of which the following is a specification.

This invention relates to improvements in locking devices primarily intended for use in connection with and for locking the controlling levers of automobiles, but, which, of course, can be used for other purposes.

It is an object of the invention to provide a lock of this kind that can be readily and quickly applied to the ordinary controlling levers. It is a further object to provide a lock which can be readily and quickly locked without the use of a key for holding the lever against surreptitious movement. It is a further object to provide a lock of this type with means for automatically throwing it out of locking position when the bolt has been withdrawn.

The above and other features of advantage and capabilities will become apparent from a detail description of the accompanying drawings, in which we have illustrated one form of our invention, but the embodiment as there shown is understood as illustrative only.

Figure 1 is an elevational view of a universally mounted controlling lever for automobiles showing a lock embodying our invention mounted thereon.

Fig. 2 is a cross-sectional view of the same, showing the lever in elevation.

Fig. 3 is a top plan view of the same.

Fig. 4 is a detail plan view of the transmission plate.

Fig. 5 is an elevational view of the casing in which the locking mechanism is mounted, showing the arrangement for connecting the two parts of the case, and Fig. 6 is a view taken on the line 6—6 of Fig. 5.

Referring to the drawings in detail, the lever 10, which is provided with a ball 11, is mounted in a suitable casing 12, which casing is provided at its upper end with an outwardly extending circular flange 13, which flange is secured to the floor of the machine at a convenient point within reach of the operator by any suitable means, such, for example, as the screws shown. The lower end of the casing is also provided with outwardly and inwardly extending flanges, to which is secured the usual transmission plate for holding the lever in different positions, the lower end of the lever being by any practical means suitably connected to the transmission gearing. The upper portion of the casing is screw-threaded internally to receive the screw-threaded lower portion of the plug 14, which plug is provided with a cavity having downwardly and inwardly inclined walls. Slidably mounted on the lever 10 is a lock carrying casing 15 which consists of two parts, one of said parts being provided with tongues 16, adapted to fit into corresponding grooves in the other member of the casing, said parts being provided with openings in alinement to receive pins 17 for securing the parts together, (as best shown in Fig. 5). By so constructing the casing we provide one which can be readily secured in position on the controlling lever without removing the lever or the enlarged handle thereof.

The lower portion of the lock carrying casing is provided with downwardly and inwardly inclined walls corresponding with the opening in the plug 14 and adapted to fit therein and engage the walls thereof. One member of the casing near the upper end thereof is provided with a large circular internally screw-threaded opening designed to receive an externally threaded lock barrel 18, in which barrel is rotatably mounted a key controlled lock cylinder 19, to which cylinder is fixed, by means of the screws 20, there being only one shown, a shank 21 which carries a cam 22. Below the barrel 18 the casing is provided with three bores, (as best shown in Fig. 6,) the center one of which has slidably mounted therein the locking bolt which carries a vertical pin provided on its upper end with a ball, which is at all times held in engagement with the cam 22 by means of the compression springs 23 on either side of the bolt, the compression springs 23 being adapted to engage the cross pin 24, which extends through the bolt and at all times exerts an inward pressure on the bolt. From this it will be seen that as the cylinder 19 is rotated in the proper direction the bolt is withdrawn and when the bolt is brought to register with the opening by forcing the casing downwardly to a locking position it is forced inwardly by the compression springs.

While we have described somewhat in detail the particular locking mechanism carried by the lock casing, we do not wish to be understood as being limited to this particular form, as various different forms of key controlled spring locked mechanisms may be utilized.

For throwing the lock casing upwardly and out of engagement with the plug 14 after the bolt has been withdrawn, we provide a lift rod 25 which is connected at its upper end to the lever 10 by means of a pin 26, and at its lower end is screw-threaded into a plug 27, which plug is provided with a bifurcated end designed to rest on a pin 29 connecting with the lever 10. Surrounding the lift rod 25, and confined between the upper end of the casing and the plug 27, is a compression spring 28, which at all times exerts a lifting action on the casing, so that when the bolt is withdrawn the spring 28 throws the lock carrying casing to the position shown in dotted lines in Fig. 1, and when the lock carrying casing is in this position and it is desired to lock the lever 10 in neutral position against surreptitious movement, all that is necessary is for the operator to simply press downwardly on the lock carrying casing with his foot or otherwise, until it has reached its locking position, at which point the compression springs on either side of the bolt on the lock automatically forces the bolt into the aperture in the lever 10, where it is held until the operator again desires to use the machine, at which time he simply inserts and turns the key, thus withdrawing the bolt. The moment the bolt is withdrawn the compression spring 28 throws the lock carrying casing upwardly out of locking engagement and to a position where it does not in any way interfere with the operation of the lever. From this it will be seen that the only time the key is utilized is when withdrawing the bolt, and that it is not necessary for the operator to in any way resort to a key for locking the lever in a neutral position against surreptitious movement.

We claim:

1. In a device of the class described, a lever having an enlargement adapted to coöperate with another member to form a universal connection, a universal bearing member on which said lever enlargement is mounted, a conical opening in said bearing member to permit said lever to have free, limited movement in all directions, a casing completely surrounding the body portion of said lever above said enlargement and having a chamber in its upper portion, a cover integral with said casing having a slot therein slidably fitted around said lever, a locking member formed integrally with said casing at the bottom thereof, entirely surrounding said lever, and adapted to fit within the conical opening in said bearing member when in a lowered position, to prevent movement of said lever, means housed within the chamber in said casing to engage said lever and lock said casing in its lowered position, and means housed within said chamber to automatically raise said casing upon the release of said locking means, said raising means comprising a rod attached at its two ends to the control lever and passing through the said cover, and a spring surrounding said rod and engaging with its lower end the lower support for the rod, and with its upper end the cover of the casing.

2. In a device of the class described, a unitary casing adapted to entirely surround a control lever, and provided in its upper portion with a chamber and at its lower portion with a locking member adapted to entirely surround said lever, locking means housed within said chamber and adapted to lock said locking member in its locking position, and means housed within said chamber for automatically raising the locking member on the release of said locking means, said raising means comprising a rod adapted to be attached at its two ends to the control lever and passing through the said cover, and a spring surrounding said rod and engaging with its lower end the lower support for the rod, and with its upper end the cover of the casing.

3. In a transmission lock, a sleeve adapted to surround the transmission lever, a key controlled locking bolt slidable in said sleeve and adapted to hold the sleeve in substantially fixed position longitudinally of the lever, a pin extending through said bolt and outwardly from opposite sides thereof, and a pair of springs located on opposite sides of said bolt, and adapted to engage the projecting parts of said pin to force the bolt into locking position.

In witness whereof, we hereunto subscribe our names to this specification in the presence of two witnesses.

AUGUSTUS C. SAXTON.
HENRY J. MENARD.

Witnesses:
HARRY E. ANDERSON,
LEE HAMMOND.